United States Patent

[11] 3,615,254

[72] Inventors Franz Eichenseer
Wiesbaden-Schierstein;
Hans Kletschke, Essen-Kupferdreh, both of Germany
[21] Appl. No. 864,269
[22] Filed Sept. 29, 1969
[45] Patented Oct. 26, 1971
[73] Assignee Kalle Aktiengesellschaft
Wiesbaden-Biebrich, Germany
[32] Priority May 6, 1965
[33] Germany
[31] K 56022
Division of Ser. No. 786,843,
Dec. 20, 1968, now abandoned,
which is a continuation of application
Ser. No. 547,659, May 4, 1966,
now abandoned.

[54] SCREW PRESS USEFUL IN THE MANUFACTURE OF ALKALI CELLULOSE AND CELLULOSE ETHERS
3 Claims, 1 Drawing Fig.
[52] U.S. Cl. .................................................. 23/285,
18/12 SP, 25/14, 259/6, 259/104, 260/231, 260/232
[51] Int. Cl. ................................................... B01j 1/00,
B29b 1/10, C08b 11/20
[50] Field of Search .......................................... 23/285,
252, 290; 259/6, 104; 18/12 SP, 30 SM; 25/14;
260/231, 232, 7 SM; 264/286, 287

[56] References Cited
UNITED STATES PATENTS
2,115,006  4/1938  Burghauser ................. 259/6
2,434,707  1/1948  Marshall ..................... 259/6 X Primary Examiner—Joseph Scovronek
Attorney—James E. Bryan ABSTRACT: This application discloses a new modification of a two-screw press of the known type in which the screws are of the Mapre type, i.e. have a rectangular thread profile. The modification concerns the depth of the thread. Its use is advantageous for promoting the reaction of fibrous cellulose with alkali, or with alkali and with a liquid or solid etherifying agent, or for promoting the reaction of fibrous alkali cellulose with a liquid or solid etherifying agent.

PATENTED OCT 26 1971 3,615,254
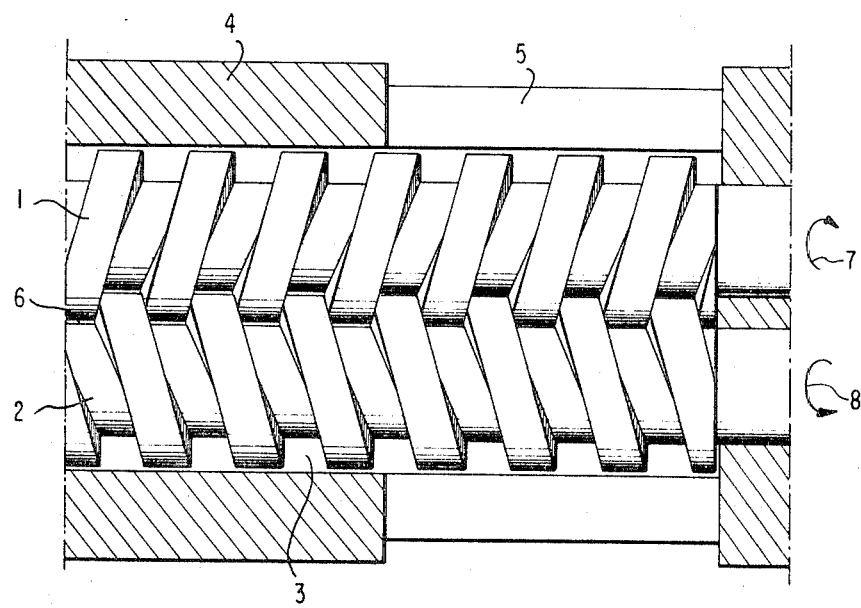
INVENTORS
FRANZ EICHENSEER
BY   HANS KLETSCHKE
*James E. Bryan*
ATTORNEY

SCREW PRESS USEFUL IN THE MANUFACTURE OF ALKALI CELLULOSE AND CELLULOSE ETHERS

CROSS-REFERENCE TO RELATED APPLICATIONS

The present application is a division of copending U.S. Pat. application Ser. No. 786,843, now abandoned filed Dec. 20, 1968, which is a continuation of U.S. Pat. application Ser. No. 547,659, filed May 4, 1966, now abandoned.

BACKGROUND OF THE INVENTION

This invention is concerned with improvements in the manufacture of alkali cellulose and cellulose ethers.

It is known to produce cellulose ethers by reacting alkali cellulose with suitable solid or liquid etherifying agents. The alkali cellulose required for this purpose has been obtained in a separate operation by reacting cellulose or materials containing cellulose with alkali, especially sodium hydroxide. Thus, the cellulose ethers are in this case produced in a two-stage process.

It is moreover known to produce cellulose ethers in a single-stage process by reacting cellulose or materials containing cellulose with solid or liquid etherifying agents in the presence of alkali.

Both processes are performed on an industrial scale. The single-stage process has the advantage of requiring less equipment, while the two-stage process has the advantage of greater variability, since the molecular weight and the distribution of the molecular weight of the alkali cellulose can be controlled by suitable reaction conditions during the preparation thereof. The common feature of the two processes is that a fibrous or fibrous and friable solid substance must be reacted. This circumstance, above all, makes it difficult to avoid using more than the equivalent quantity of any reactant other than the cellulosic reactant.

The aim of carrying out the process with the smallest quantity of other reactant that is theoretically necessary cannot be completely achieved either in the reaction of alkali cellulose with etherifying agents to give cellulose ether or in the reaction of cellulose with alkali and etherifying agents to give cellulose ether. Generally, the process is carried out in the presence of comparatively small amounts of liquid, so that the reaction mixture forms a loose, friable, fibrous mass. In such a mixture the reaction proceeds comparatively slowly and considerable amounts of the etherifying agent are eliminated from the reaction by hydrolysis. In addition, the reaction products do not meet with the requirements of uniformity.

Accordingly, in order to increase the reaction velocity and to obtain a uniform product, the reaction has been carried out in kneading devices, but products sufficiently uniformly etherified have not been obtained in this way; in addition, continuous operation is not possible.

A substantial acceleration of the etherification process and the possibility of continuous operation were first achieved by the use of screw presses. At the present time, both single-screw and multiscrew presses are used for the continuous etherification of alkali cellulose or of cellulose with alkali and etherifying agents. When single-screw presses are employed, however, it must be borne in mind that the conveying capacity depends greatly on the liquid content of the medium being conveyed. The quality of the cellulose ether obtained accordingly becomes dependent on the nature of the alkali cellulose, so that continuous supervision of the process is required. The use of mulitscrew presses, however, also has not so far given fully satisfactory results. Their conveying capacity is substantially independent of the moisture content of the material to be conveyed and homogenized, but the intake capacity of the screws in the intake or feed portion is subject to variations in dependence upon the quality of the starting material. Moreover, the quality of the etherification product that can be obtained in laboratory operation when the reaction mixture is passed through a screw press several times, cannot be attained in industrial practice with the multiscrew presses hitherto employed.

The above-mentioned object of achieving the reaction of cellulose or its derivatives as far as possible with only the equivalent quantity of any other reactant cannot, however, be attained in the production of alkali cellulose from cellulose with alkali. Mixture of cellulose with only a small excess of concentrated aqueous sodium hydroxide also are of a fibrous and friable nature, but it has not been possible hitherto to homogenize them by means of single-screw or multiscrew presses.

The intake capacity of single-screw presses for this mixture is poor and they also convey it unsatisfactorily. They cease to convey it altogether if a pressure gradient builds up within the press. The mixture of cellulose and alkali then becomes jammed in the threads of the screw and is moved only in a circle. On the other hand, in the case of multiscrew machines a more or less adequate conveying capacity is initially achieved if the material to be conveyed is not too dry. Nevertheless, homogenization of the medium has not been successfully achieved at all. This is a requirement, however, since otherwise the conversion into alkali cellulose proceeds too slowly in the tightly compressed material.

Alkali cellulose is therefore generally produced by immersion of sheets of cellulose or endless webs of cellulose in an excess of cold or hot sodium hydroxide solution and then squeezing out. Screw centrifuges are used for this purpose in order to obtain at least partial homogenization during the squeezing-out process.

Therefore, the problem has hitherto existed to produce a homogenizing and conveying means with which fibrous and friable reaction mixtures of cellulose and alkali cellulose and etherifying agents, or of cellulose and alkali and etherifying agents, could be homogenized and conveyed so that the corresponding reactions could be accelerated.

It was to be expected that, in spite of the multiplicity of negative results, this object most likely could be achieved by the use of a two-screw or multiscrew press, since in these presses high shearing and compressive forces occur which should be capable of effecting homogenization of the material if the flow properties of the material and the characteristics of the screw could be suited to one another. However, the action of the known screw presses is in general totally inadequate for the homogenization and transport of fibrous and friable reaction mixtures such as occur especially in the manufacture of alkali cellulose and cellulose ethers. Merely, a two-screw press of the known type in which the screws are of the Mapre type, i.e. have a rectangular thread profile and are counterrotated with respect to each other, proved to be applicable.

SUMMARY OF THE INVENTION

The invention is concerned with a new modification of the known two-screw press of the Mapre type in which the screws interengage with a housing, part of which is occupied by an intake. The modification concerns the depth of the thread. More precisely, the modification consists in an inequality of the thread of the interengaging screws such that each of them has a greater depth of thread in the part of the housing not occupied by the intake than in the part occupied thereby. Hence, generally spoken, the object of the invention is a press including a housing, said housing having an intake opening formed therein, two screws of substantially uniform outer diameter, substantially continuous rectangular thread profile and substantially constant thread flank spacing throughout their length, and being supported within said housing, means for rotating one screw in a particular direction, means for counterrotating the other of said screws with respect to the one, said screws being mirror images of one another and being engaged with one another, said screws having a certain depth of thread adjacent said intake opening and having a greater depth of thread at a point spaced from said intake opening to define a clearance between the screws. The two-screw press of the invention is more apt to promote reactions of fibrous cellulose materials with liquid or solid reactants than known screw presses of the Mapre type.

A two-screw press of the invention is illustrated in the accompanying drawing, the single figure of which is a plan view of the press with the intake and a part of the shell of the housing removed.

BRIEF DESCRIPTION OF THE DRAWING

The drawing illustrates a longitudinal cross section through a press according to the present invention.

DESCRIPTION OF THE PREFERRED EMBODIMENT

Referring to the drawing, the two screws 1 and 2 of rectangular profile 3 which are images of one another are mounted in a housing 4 which in cross section has the form of a figure eight and which has an intake opening 5. Within the housing 4, the screws have a clearance 6 with respect to one another, while in the intake portion the clearance between the screws is made very much smaller. The screw shafts rotate in opposite directions indicated by the arrows 7 and 8. The outlet of the double-screw press in not shown in the drawing. The press itself is of customary double-screw press design. The outlet opening may be closed by a sieve plate by which the final pressure in the double-screw press can be regulated.

Friable, moist cellulose material is taken in a downward direction into the housing on both sides of the intake opening by the rectangular profile of the counterrotating screws. The smaller the clearance between the screws, the more material is packed between the inner and outer peripheries of the two screws, which peripheries converge at the base of the housing, so that the empty screw space at the top again becomes available for conveying the material. Of all the profiles tested, the rectangular profile showed the greatest intake effect. Within the housing, owing to the somewhat large clearance between the screws, more vigorous longitudinal mixing and conveyance of the material occurs. By employing the Mapre screw press, as illustrated, it is possible to homogenize in an excellent manner both friable, moist mixtures of cellulose and alkali hydroxide and also reaction mixtures for producing cellulose ethers. Thus, cellulose ethers of very good quality can be produced from alkali cellulose by admixing appropriate liquids, for example hydroxypropyl cellulose by admixing propylene oxide, or carboxymethyl cellulose by admixing monochloracetic acid, or by admixing appropriate solids, such as monochloracetate in the preparation of carboxymethyl cellulose.

It is advantageous to effect a coarse admixture of the reactants before they enter the Mapre double-screw press, in order to facilitate the action of the press. However, if the individual reaction constituents are supplied in a sufficiently uniform manner, it is possible to employ the double-screw press for the entire mixing process. As already has been stated, the reaction mixture should be fibrous and friable when it enters the double-screw press. This means that the reaction mixture is not wet, but at most it is moist to the touch. When cellulose is mixed with sodium hydroxide, this desired state is reached when 1–2 parts by weight of sodium hydroxide solution are used to about one part by weight of cellulose. In the production of cellulose ethers, irrespective of whether they are prepared directly from cellulose or from alkali cellulose, about one to 1.5 parts by weight of liquid can be used with advantage to one part by weight of cellulose or alkali cellulose.

Not only is it possible to carry out the homogenization of the reactants by means of Mapre screw presses, but completely or· partially the conversion into the desired final product also can take place directly in the screw press. In the latter case, it is particularly advantageous to provide the screw press with suitable heating or cooling devices. In this way, regulation both of the reaction velocity and of the molecular size of the final product can be effected. Both the housing and the screws are advantageously double walled and are heated or cooled. The screws and the housing are heated, when, for example, it is desired to obtain some ripening at the same time during the preparation of alkali cellulose. In this way, by suitable relative adjustment of heating and dwell time, the desired degree of ripening can be obtained. When, on the other hand, retention of a particular molecular size is required, the heat of reaction and the frictional heat are removed by cooling.

The external dimensions of the screw press must be adapted to the desired degree of homogenization and to the throughput that is required. It is in general the case that a large capacity and a long dwell time are required when the conversion of the reactants is to be fairly exhaustive. In this case, the apparatus may be equipped with a low power drive. A higher power drive is required when the screw press has a small internal capacity and the material to be put through is to have only a brief dwell time.

It is generally advisable to make the depth of the threads of the screws relatively great. The compression rate obtained by means of the screw should be 3:1 at the maximum. The final pressure at the outlet of the screw press should not be more than 300 atmospheres gauge. At present, maximum throughputs of 75 kg. per hour with a screw diameter of 92 mm. and a speed of 22r.p.m. can be obtained with Mapre screw presses.

The advantageous operation of Mapre presses in comparison with other screw presses, in particular double-screw presses, is illustrated in the following examples.

EXAMPLE 1

15 kg. of coarsely shredded alkali cellulose with a cellulose content of 45 percent by weight and a sodium hydroxide content of 16 percent by weight were intensively mixed for 5 minutes with 3.5 kg. of sodium chloracetate in a mixer. The resulting mixture was then pressed through a commercial double-screw press of the Mapre type with a screw diameter of 92.6 mm. and a screw length of 742 mm. The speed of the screws was 8 r.p.m. and the throughput was 23 kg./hour.

The reaction time in the double-screw press was 15 minutes at a temperature of 60° C. The mixture was then subjected to an afterreaction product was effected in the conventional manner. The etherification product obtained in this way, in 2 percent aqueous solution at 20° C., had a viscosity of 260 cp. (centipoises) and a solution residue of 11 percent by weight.

When, on the other hand, a reaction mixture prepared in the same way was kneaded in an intensive kneader for 60 minutes at 60° C. in the hitherto customary manner, an etherification product was obtained which had a viscosity of only 113 cp. and a water-insoluble residue of 22 percent by weight.

This shows that considerably improved products are obtained with the Mapre double-screw press.

EXAMPLE 2

10 kg. of cellulose powder were mixed with 20 kg. of 45 percent sodium hydroxide for about 15 minutes in a stirrer. The resulting mixture was passed once through a Mapre double-screw press of the special form described above and the dimensions of which were as follows: Screw diameter 92 mm., screw length 850 mm., width of thread 22 mm., depth of thread in the intake portion 24 mm., depth of thread in the housing 24.5 mm.; clearance between the screws in the intake portion: the screw shafts bore tightly on one another; clearance between the screws in the housing 1 mm., pitch of the screws 40 mm., speed of the screws 8 r.p.m. throughput 30 kg./hour.

The resulting homogenized mixture was left to stand for about another 0.5 hour, so that the reaction could be completed. For the purpose of testing the homogeneity of the product, etherification thereof with methyl chloride was then carried out. A measure of the uniformity of the conversion is the viscosity and the water-insoluble residue of the ether.

With a 2 percent solution of the ether, a viscosity of 1500 cp. was measured at 20° C., 1.5 percent by weight of the ether was insoluble in water.

For comparison purposes, a reaction mixture prepared in the same way was passed through a double-screw press in which the screws also rotated in opposite directions but had a chamfered profile.

To obtain the same throughput as in the above-mentioned case, the thread volume of this double-screw press had to be selected about 20 percent larger. The speed had to be increased to 15 r.p.m. The homogenized mixture was again reacted with methyl chloride in this case and the viscosity of the etherification product and the residue insoluble in water were determined. A viscosity of 1200 cp. and an insoluble residue of 5 percent by weight were found.

The same test was repeated once more, this time using screws rotating in the same direction and also with a rounded-off self-disengaging profile. In this case, a screw thread volume about 30 percent larger than in the case of the double-screw press according to the invention was required. In addition, the speed had to be increased to 14 r.p.m., which can be attributed to the direction of rotation being the same. The methyl ether obtained by etherification of the alkali cellulose produced in this way, in 2 percent aqueous solution at 20° C., showed a viscosity of 1000 cp. and a residue of 7 percent by weight.

This shows clearly that a substantially more uniform product with an increased throughput can be obtained with the special Mapre double-screw press.

It will be obvious to those skilled in the art that modifications may be made within the scope of the present invention without departing from the spirit thereof, and the invention includes all such modifications.

What is claimed is:

1. A press including a housing, said housing having an intake opening formed therein, two screws of substantially uniform outer diameter, substantially continuous rectangular thread profile and substantially constant thread flank spacing throughout their length, and being supported within said housing, means for rotating one screw in a particular direction, means for counterrotating the other of said screws with respect to the one, said screws being mirror images of one another and being interengaged with one another, said screws having a certain depth of thread adjacent said intake opening and having an about 2 percent greater depth of thread at a point spaced from said intake opening to define a clearance between the screws.

2. Apparatus as defined in claim 1 wherein said housing has a cross-sectional configuration substantially in the form of a figure 8.

3. Apparatus as defined in claim 1 wherein the compression rate obtained by means of the screws has a maximum value of about 3:1.

UNITED STATES PATENT OFFICE
CERTIFICATE OF CORRECTION

Patent No. 3,615,254              Dated October 26, 1971

Inventor(s) Franz Eichenseer et al

It is certified that error appears in the above-identified patent and that said Letters Patent are hereby corrected as shown below:

Column 1, line 16, "iequired" should read
- - - required - - -.

Column 2, line 5, "Mixture" should read
- - - Mixtures - - -.

Column 4, line 37, after "product" - - - at 60° C. over a period of 48 minutes. The working up of the reaction - - - should be inserted.

Signed and sealed this 28th day of March 1972.

(SEAL)
Attest:

EDWARD M. FLETCHER, JR.                ROBERT GOTTSCHALK
Attesting Officer                      Commissioner of Patents